United States Patent [19]

Ayzenberg et al.

[11] Patent Number: 5,786,865

[45] Date of Patent: Jul. 28, 1998

[54] APPARATUS AND METHOD FOR DIGITAL AMPLITUDE AND PHASE DETECTION

[75] Inventors: Oscar Ayzenberg, Sunnyvale; Anatoliy V. Tsyrganovich, Cupertino, both of Calif.

[73] Assignee: Zilog, Inc., Campbell, Calif.

[21] Appl. No.: 673,264

[22] Filed: Jun. 28, 1996

[51] Int. Cl.⁶ ...................................................... H04N 5/06
[52] U.S. Cl. .......................... 348/505; 348/642; 348/508
[58] Field of Search ................................. 348/505, 555, 348/642, 644, 646, 720, 549, 546, 508, 507, 506, 643, 645, 647, 638, 639, 640; H04N 5/46, 5/06

[56] References Cited

U.S. PATENT DOCUMENTS

| 4,510,521 | 4/1985  | Ruprecht et al.         |
|-----------|---------|-------------------------|
| 4,633,484 | 12/1986 | Takeda et al.           |
| 4,635,103 | 1/1987  | Steckler et al. 348/505 |
| 4,636,836 | 1/1987  | Steckler et al. 348/505 |
| 4,686,560 | 8/1987  | Balaban et al. 348/508  |
| 4,700,217 | 10/1987 | Balaban et al. 348/505  |
| 4,812,783 | 3/1989  | Honjo et al. 348/546    |
| 4,989,074 | 1/1991  | Matsumoto.              |
| 5,093,930 | 3/1992  | Kasperkovitz.           |
| 5,251,041 | 10/1993 | Inoue et al. 348/505    |
| 5,396,294 | 3/1995  | Fujii et al. 348/508    |
| 5,452,016 | 9/1995  | Ohara et al.            |
| 5,481,313 | 1/1996  | Kim 348/505             |
| 5,579,056 | 11/1996 | Chang 348/555           |

FOREIGN PATENT DOCUMENTS 2130826  11/1983  United Kingdom.

OTHER PUBLICATIONS

Krauss et al., pp. 284–285 ("Product Detectors") in *Solid State Radio Engineering*, New York: John Wiley & Sons, 1980.

Primary Examiner—John K. Peng
Assistant Examiner—Jean W. Désir
Attorney, Agent, or Firm—Majestic, Parsons, Siebert & Hsue

[57] ABSTRACT

A digital amplitude and phase detector for detecting the amplitude and phase of a color burst digital signal used in television systems is provided. The detector comprises a phase lock loop circuit for detecting the phase of said color burst signal and for generating a synchronous constant amplitude sinusoidal signal; multiplying circuit for generating a product signal by multiplying the color burst signal by the constant amplitude sinusoidal signal, wherein said product signal has a high-frequency component and a low-frequency component having an amplitude substantially proportional to that of the color burst signal; and low pass filter circuit coupled to said multiplying circuit for filtering said product signal such that the high-frequency component is substantially suppressed relative to that of the low-frequency component. A video encoder using the digital amplitude and phase detector is also provided.

30 Claims, 2 Drawing Sheets

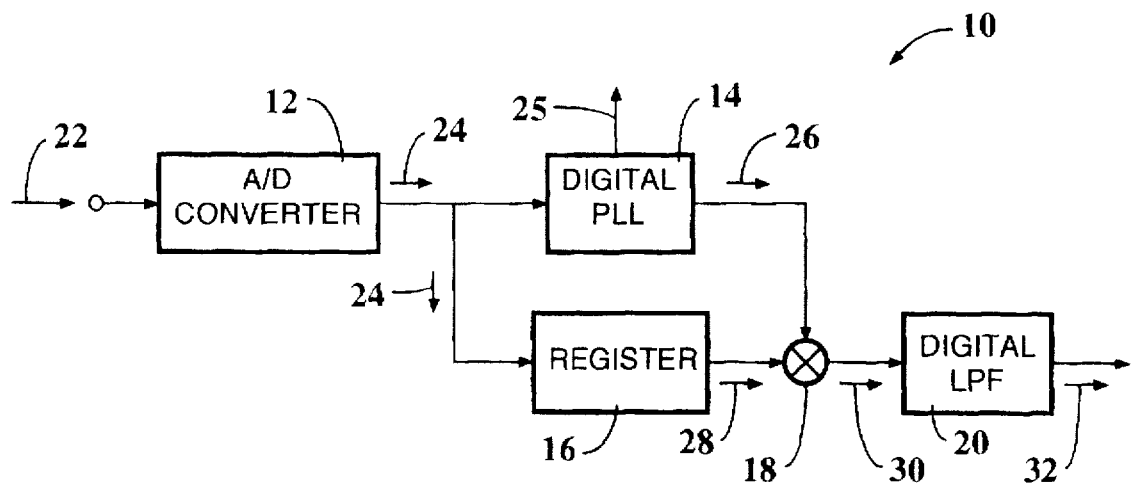
FIG._1.
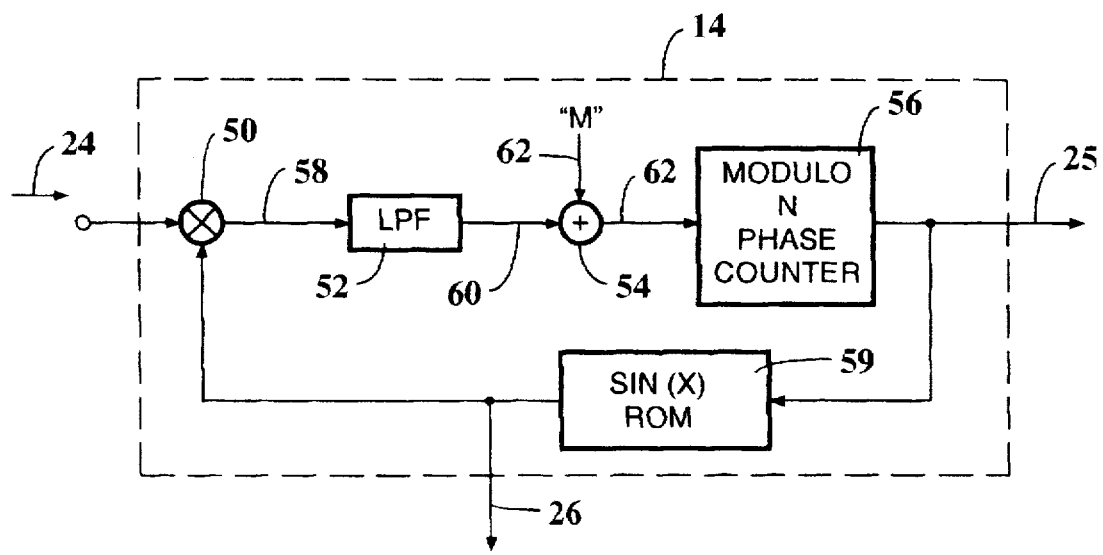
FIG._2.

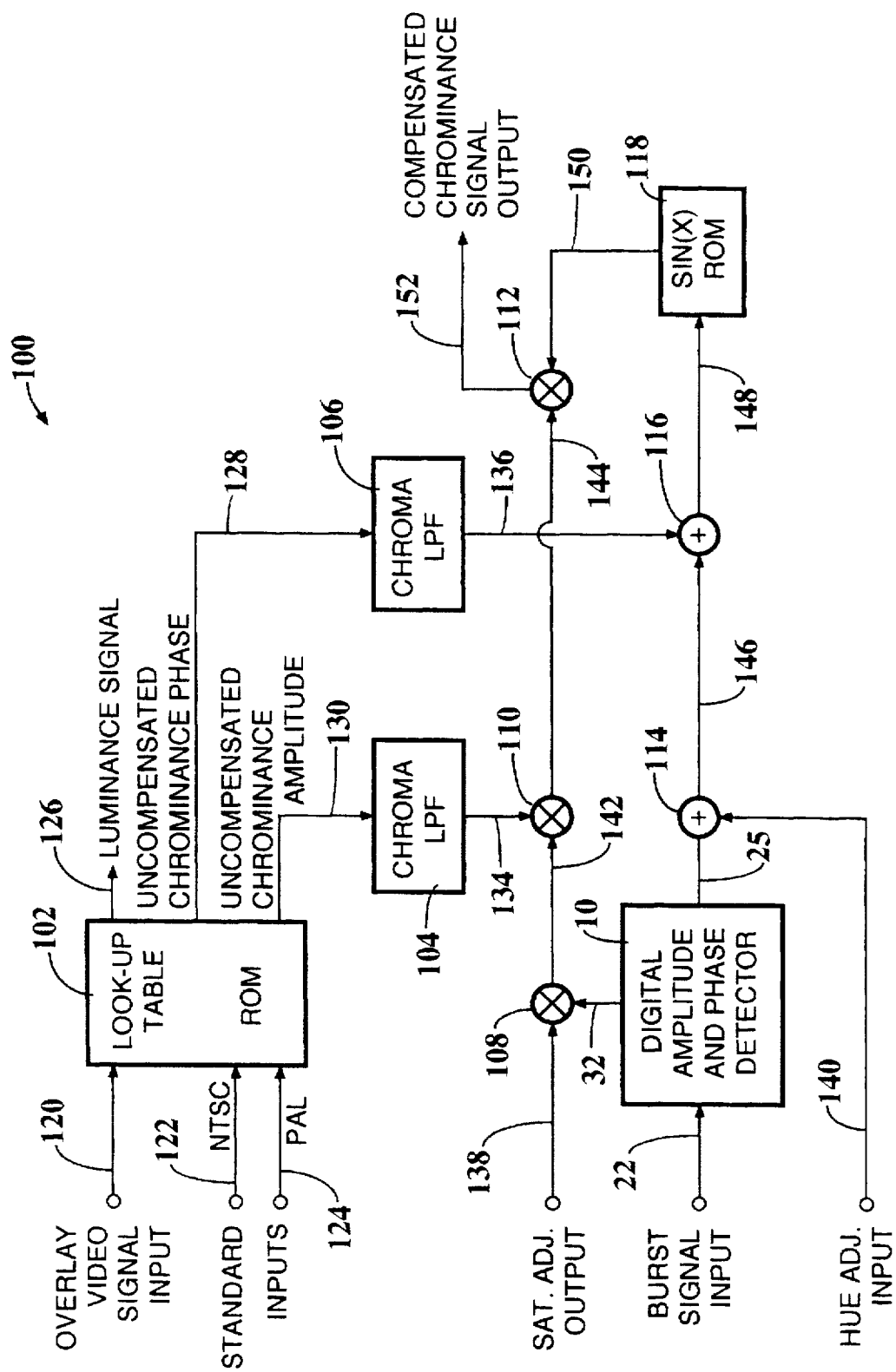
FIG._3.

5,786,865

APPARATUS AND METHOD FOR DIGITAL AMPLITUDE AND PHASE DETECTION

FIELD OF THE INVENTION

This invention relates generally to an apparatus and method for amplitude and phase detection, and more specifically, to an apparatus and method for detecting the amplitude and phase of a color burst video signal.

BACKGROUND OF THE INVENTION

Many television systems throughout the world transmit and receive video signals based on the National Television Systems Committee (NTSC) standard or the Phase Alternate Lines (PAL) standard. Both standards have prescribed its own rules governing the transmission of video signals, however, there are many common characteristics. For instance, the composite video signal for either standard generally comprises the luminance signal (Y-signal), the chrominance signal, the color burst signal, the horizonal and vertical synchronization pulses and a dc component corresponding to the average scene brightness of the picture.

Of particular interest to this invention is the chrominance and color burst signals. The chrominance signal carries the color information for the images that are displayed in the television's cathode ray tube (CRT). The chrominance signal is an approximately 3.58 MHZ subcarrier for the NTSC and 4.43 MHZ subcarrier for the PAL standard which appears within the composite video signal between the period defined by two consecutive horizonal blanking pulses; such period corresponds to the time used for tracing one horizonal line on the CRT. The color information is phase and amplitude modulated onto the subcarrier such that a particular phase and amplitude combination corresponds to a particular red, green and blue (RGB) combination. During sweeping of the CRT display, the phase and amplitude of the chrominance signal varies according to the color information of the video images being displayed.

Also part of the composite video signal is the color burst signal. The color burst signal is used as a reference signal for the chrominance signal. More specifically, it is not the absolute phase and amplitude of the chrominance signal that carries the color information; rather it is the phase and amplitude relationship between the chrominance signal and the color burst signal that determines the color information of the video images being displayed.

The reason for the color burst signal is that many factors affect the phase and amplitude of the chrominance signal. Such factors may include differences in propagation distance between transmitter and receivers, environmental affects, difference in transmitting station power and so on. If the color burst signal is not present, such factors would continuously affect the chrominance signal received and consequently affect the video images being displayed. With the color burst signal serving as a reference, such factors would similarly affect the color burst signal; however, the relationship between the chrominance and the color burst signals would remain unaffected.

Therefore, in order to display proper video signals, the detection of the amplitude and phase of the color burst is required. A television receiver uses the color burst amplitude information to maintain a substantially constant ratio between the intensity of the chrominance signal and that of the color burst signal. A television receiver also uses the color burst phase information to maintain a constant phase difference between the phase of the color burst and the phase-color relationship of the chrominance signal. Therefore, there is a need for a circuit for detecting the amplitude and phase of the color burst signal in order to properly display video images.

The need for detecting the amplitude and phase of the color burst signal also arises in the implementation of video encoders. Video encoders are usually used in VCRs, Setup boxes and related applications to overlay various types of information with the video image being displayed on the CRT. Such information often comes in menu form and can include user interface information such as current time, whether close caption or sleep modes are on, V-chip information, and so forth.

A video encoder generally synthesizes a chrominance signal having color information concerning the desired information being displayed. This chrominance signal is then combined with the chrominance signal received by the television receiver, in order for both video images to be displayed at once. Since the color information of the chrominance signal depends on the relationship between the color burst and chrominance signals, the video encoder needs to detect the amplitude and phase of the color burst in order to synthesize its chrominance signal. Thus, there is a need for a detector for detecting the amplitude and phase of the color burst so that video encoders can properly synthesize its chrominance signal.

In addition to the fact that there is a need for a circuit which detects the amplitude and phase of the color burst signal, it is preferable to have a digital implementation of such circuit. Much of the signal processing circuits in television receivers, VCRs, setup boxes and related applications today are being implemented in digital form. Digital signals offer a substantial benefit over their analog counterparts. Digital signals are generally less susceptible to noise, interference and degradation; they are generally easier to implement in integrated circuit form; they are generally easier to manufacturer and require less time and effort to build; and they are more amenable to control by way, for example, of microprocessors and computers. Thus, there is a need for a digital implementation of the phase and amplitude detector used in television systems for detecting the amplitude and phase of a color burst signal.

Furthermore, there is a need for a video encoder used in television systems which utilizes digital technology. The reason being is that it is easy to store video digital signals of overlay informational images which can be easily access by the use of a microprocessor, computer or the like. Such microprocessor, computer or the like can also allow a television user control of user interface parameters and information, and simultaneous displaying of the information on the television display facilitates the user in changing the parameters and information. Since it is preferred that video encoders are implemented using digital signals, it is likewise preferred that an amplitude and phase detector is used which uses digital technology to make it more compatible with digital video encoders.

OBJECTS OF THE INVENTION

Thus, it is an object of this invention to provide an amplitude and phase detector circuit for detecting the amplitude and phase of a color burst signal.

It is another object of this invention to provide an amplitude and phase detector circuit for detecting the amplitude and phase of a color burst signal which is less susceptible to noise, interference and degradation.

It is another object of this invention to provide an amplitude and phase detector circuit for detecting the amplitude and phase of a color burst signal which is implemented in digital form.

It is another object of this invention to provide an amplitude and phase detector for detecting the amplitude and phase of a color burst signal which can be easily implemented in integrated circuit form.

It is another object of this invention to provide a video encoder that uses the digital amplitude and phase detector in synthesizing a color burst compensated chrominance signal from an input video signal.

SUMMARY OF THE INVENTION

These and additional objects are accomplished by the various aspects of the present invention, wherein, briefly and generally, a digital amplitude detector is provided for detecting the amplitude of a color burst signal used in television reception and in video encoding. The digital detector comprises a phase lock loop circuit for generating a constant amplitude sinusoidal digital signal in response to the color burst signal having a phase angle approximately 90 degrees out-of-phase with that of said color burst signal. The detector further has a delay circuit for delaying the color burst digital signal by a selected amount of clock cycles and a multiplying circuit for generating a product signal by multiplying the delayed color burst signal by the constant amplitude sinusoidal signal, wherein said product signal has a high-frequency component and a low-frequency component having an amplitude response substantially proportional to that of the color burst signal. A low pass filter means is included in the detector for filtering the product signal such that the intensity of the high-frequency component is substantially lower than that of the low-frequency component.

Another aspect of the invention is a combination digital amplitude and phase detector for detecting the amplitude and phase of a color burst signal. The digital amplitude and phase detector comprises a phase lock loop circuit for detecting the phase of the color burst signal and for generating a constant amplitude sinusoidal signal in response to said color burst signal. The frequency of the constant amplitude sinusoidal signal is substantially the same as that of the color burst signal. The detector further includes a multiplying circuit for multiplying the color burst signal with the constant amplitude signal such that a product signal forms. The product signal comprises a high-frequency component and a low-frequency component; both of which have an amplitude response proportional to that of the color burst signal. The amplitude and phase detector further has a low pass filter circuit for filtering the product signal such that the intensity of the high-frequency component is substantially lower than that of the low-frequency component.

Still another aspect of the invention is a method for detecting a time-varying amplitude of a color burst digital signal comprising removing the time-varying amplitude from the color burst signal, thereby leaving a constant amplitude sinusoidal signal having a frequency which is substantially the same as that of the color burst signal; multiplying the color burst signal by the constant amplitude sinusoidal signal for generating a product signal having a high-frequency component and a low-frequency component which has an amplitude response substantially proportional to the time-varying amplitude; and filtering the product signal such that the intensity of the high-frequency component is substantially lower than that of the low-frequency component.

Yet another aspect of the invention is a video encoder for generating a color burst compensated chrominance signal from an input video signal comprising means for generating an uncompensated chrominance amplitude and phase corresponding to the input video signal; means for detecting the amplitude and phase of the color burst signal; a first adder circuit for adding the phase of the color burst signal to the uncompensated chrominance phase for producing a compensated chrominance phase; a first multiplier circuit for multiplying the amplitude of the color burst signal by the chrominance amplitude for producing a compensated chrominance amplitude; a sinewave digital signal generator for generating a sinusoidal digital signal being phase modulated by the compensated chrominance phase; and a second multiplier circuit for amplitude modulating the sinusoidal digital signal by the compensated chrominance amplitude, thereby generating the color burst compensated chrominance signal.

Additional objects, features and advantages of the various aspects of the present invention will become apparent from the following description of its preferred embodiment, which description should be taken in conjunction with the accompanying drawings.

BRIEF DESCRIPTION OF THE DRAWINGS

FIG. 1 illustrates as an example a block diagram of the amplitude and phase detector as embodied in the invention;

FIG. 2 illustrates as an example of a block diagram of a digital phase lock loop as embodied in the invention; and FIG. 3 illustrates a block diagram of a video encoder as embodied in the invention.

DETAILED DESCRIPTION OF THE PREFERRED EMBODIMENTS

In FIG. 1, a block diagram of the preferred embodiment of the digital amplitude and phase detector 10 is shown. The digital amplitude and phase detector 10 comprises an analog-to-digital converter 12 having an output coupled both to a digital phase lock loop (DPLL) 14 and a register 16. The outputs of the DPLL 14 and the register 16 are both coupled to the inputs of a digital multiplier 18, which in turn has an output coupled to a digital low pass filter 20.

In operation, a color burst analog signal 22 is applied to the analog-to-digital converter 12, which samples and digitizes the analog signal to generate a color burst digital signal 24. In the preferred embodiment, the clock rate for sampling and for clocking the data through the detector is approximately 12 MHz. The color burst digital signal 24 has a time-varying amplitude A(t); and it is one of the functions of the digital amplitude detector 10 to detect such time-varying amplitude. For the purpose of facilitating the description, the color burst digital signal 24 may be represented mathematically by the following equation:

$$V_{24} = \Sigma A(t) \, \text{Sin} \, (2\pi t F_{sc}/F_{sclk})$$

where A(t) is the time-varying amplitude of the color burst digital signal 24, t is time, $F_{sc}$ is the color burst signal frequency and $F_{sclk}$ is the clock frequency.

The digital color burst signal 24 is applied to a register 16 which delays the signal by a selected amount of clock cycles to form a delayed color burst digital signal 28 which may be represented mathematically by the following equation:

$$V_{28} = \Sigma A(t) \, \text{Sin} \, (2\pi t F_{sc}/F_{sclk} + \phi)$$

where $\phi$ is the phase shift in the color burst digital signal 24 due to the delay caused by register 16. As will be explained in more detail later, the reason for the phase shift is so that the signals multiplied by multiplier 18 are not orthogonal to each other, or in other words, their phase angles do not differ by 90 degrees.

The digital color burst signal 24 is also applied to the DPLL 14. The DPLL 14 not only detects the phase 25 of the color burst digital signal 24 but generates a constant amplitude sinusoidal signal 26 which cycles at substantially the same frequency as the color burst signal cycles, but differs in phase by approximately 90 degrees, and preferably has an amplitude of 1. The constant amplitude sinusoidal signal 26 may be represented mathematically by the following equation:

$$V_{26} = \Sigma \sin(2\pi t F_{sc}/F_{sclk} + \frac{1}{2}\pi)$$

Both the delayed color burst digital signal 28 and the constant amplitude sinusoidal signal 26 are applied to a conventionally known digital multiplier 18 which generates a product signal 30 by multiplying signals 26 and 28 together. The resulting product signal 30 produced by the multiplier may be represented by the following equation:

$$V_{30} = \Sigma \frac{1}{2} A(t)(\cos(\phi + \frac{1}{2}\pi) - \cos(4\pi^2 t F_{sc}/F_{sclk}))$$

Note that the product signal 30 comprises a low-frequency component or dc-component defined as $\frac{1}{2}A(t)\cos(\phi + \frac{1}{2}\pi)$ and a high-frequency component defined as $\frac{1}{2}A(t)\cos(4\pi^2 t F_{sc}/F_{sclk})$; both of which have an intensity that varies proportionally with the time-varying amplitude A(t) of the color burst digital signal 24.

The product signal 30 is then applied to the digital low pass filter 20 for filtering the product signal 30 such that the intensity of the high-frequency component is substantially lower than that of the low-frequency component; thereby resulting in detected amplitude signal 32. Since the low-frequency component has dc frequency response or a near dc frequency response (depending on the frequency response of the time-varying amplitude A(t)), the digital low pass filter 20 is preferably a two-pole infinite-duration impulse response (IIR) low pass filter with a cutoff frequency of about 100 Hz to substantially suppress the high-frequency component relative to the low-frequency component. It shall be understood that depending on the frequency response of the low-frequency component, the number of poles and cutoff frequency may change to substantially suppress the high-frequency component without considerably affecting the low-frequency component.

Thus, the detected color burst amplitude signal 32 is substantially the low-frequency or dc component of the product signal 30 and may be represented mathematically as:

$$V_{32} = \Sigma \frac{1}{2} A(t) \cos(\phi + \frac{1}{2}\pi)$$

Since the detected color burst amplitude signal 32 is proportional to the time-varying amplitude A(t) of the color burst signal 32, it may be used in video encoders for synthesizing a color burst compensated chrominance signal corresponding to an input video signal. Note that the intensity of the detected color burst amplitude signal 32 is also proportional to the $\cos(\phi + \frac{1}{2}\pi)$, wherein $\phi$ is the phase shift resulting from the delay in the color burst digital signal 24 produced by register 16. It should be noted that if register 16 were to be removed and no delay of color burst signal 24 results (i.e. $\phi = 0$), the intensity of the detected color burst amplitude signal 32 would drop to zero since the cos $(\frac{1}{2})=0$. Thus, the register 16 is implemented such that the delay of the color burst digital signal 24 is selected in order to prevent the intensity of the detected color burst signal 32 to result in zero; and preferably, the register should be implemented to produce a delay resulting in a 90 degree phase shift of the color burst digital signal 24 in order to maximize the intensity of the detected color burst amplitude signal 32.

More generally, the problem of the intensity of the detected color burst amplitude signal 32 resulting in zero because $\phi = 0$, occurs because of the multiplication of the color burst digital signal 24 and the constant amplitude sinusoidal signal 26. Anytime these two signals are orthogonal with respect to each other (i.e. their phase difference is 90 degrees) when they are multiplied together, a $\phi$ of zero results in the product signal 30; thereby reducing the intensity of the low-frequency component, and accordingly, the intensity of the detected color burst amplitude signal 32 to zero. Thus, the purpose of the register 16 delay is to prevent the phase of the color burst digital signal 24 to be orthogonal to the phase of the constant amplitude sinusoidal signal 26 at the multiplier 18 inputs. This may be accomplished by not only delaying the color burst digital signal 24 as shown in FIG. 1, it could also be accomplished by delaying the constant amplitude sinusoidal signal 26 or delaying both the color burst signal 24 and the constant amplitude sinusoidal signal 26.

In FIG. 2, a detailed block diagram of the DPLL 14 is shown. The DPLL 14 comprises a multiplier 50 for generating a phase error signal 58 by multiplying the color burst digital signal 24 together with the constant amplitude sinusoidal signal 26. The phase error signal 58 will be zero if the color burst digital signal 24 and the constant amplitude sinusoidal signal 26 have frequencies which are synchronized and their respective phase differ by 90 degrees. If the constant amplitude sinusoidal signal deviates in frequency or phase such that the signals are no longer synchronized or do not have a phase difference of 90 degrees, the phase error signal 58 will have a lower-spectrum sinusoidal component cycling at a frequency equal to the difference in frequency between signals 24 and 26 and having an amplitude proportional to the phase deviation from 90 degrees phase difference.

The phase error signal 58 also has an upper-spectrum sinusoidal component which is substantially suppressed relative to the lower-spectrum sinusoidal component by digital low pass filter 52; thereby leaving a filtered phase error signal 60 which is substantially the lower-spectrum component. In the preferred embodiment, low pass filter 52 is a two-pole IIR digital low pass filter having a cutoff frequency of around 1000 Hz. It shall be understood that depending on the frequency response of the low-spectrum component, the number of poles and cutoff frequency may change to substantially suppress the high-spectrum component without considerably affecting the low-spectrum component.

Proper operation of the DPLL 14 is restricted to a limited frequency bandwidth. Thus, phase locking of digital signals having frequencies falling outside of the DPLL operating bandwidth will not occur. Therefore it is preferred that the bandwidth of the DPLL be centered at the frequency of the color burst digital signals, which is about 3.58 MHz for the NTSC standard and 4.43 MHz for the PAL standard. To center the operating bandwidth of the DPLL 14, the filtered phase error signal 60 is summed with a predetermined constant "M" by an adder 54 to form a frequency compensated phase error signal 62. The pre-determined constant "M" determines the center frequency $F_{p11}$ of the operating bandwidth of the DPLL 14 according to the following equation:

$$F_{p11}=F_{sclk}\cdot M/2^N$$

where N is the bit width of modulo N phase counter 56. Thus, by properly selecting "M", the center frequency of the DPLL 14 can be selected to optimize the DPLL operating bandwidth for both the NTSC and PAL color burst signals. In the preferred embodiment, phase counter 56 is a modulo 24 phase counter and the preferred value of "M" is shown below in Table 1.

TABLE 1

| VIDEO STANDARD | "M" for modulo 24 |
| --- | --- |
| NTSC(M) | 4,969,813 |
| PAL(M) | 4,964,352 |
| PAL(N) | 5,008,078 |
| PAL(B,D,G,H,I) | 6,198,648 |

If other than a modulo 24 phase counter is used, the preferred value of "M" may be calculated according to the following equation:

$$F_{sclk}/F_{sc}=2^{(N-M')}$$

The frequency-compensated phase error signal 62 is applied to phase counter 56. The phase counter 56 generates the phase 25 of the constant amplitude sinusoidal signal 26 in response to the frequency-compensated phase error signal 56, such that the color burst digital signal 24 and the constant amplitude sinusoidal signal 26 have frequencies which are synchronized or are substantially the same, and their respective phase differ by 90 degrees. Since the phase 25 of the constant amplitude sinusoidal signal during "locking" of the DPLL is 90 degrees out-of-phase from that of the color burst signal, phase 25 is a direct measurement of the color burst signal phase; thereby, detection is accomplished. Phase 25 can then be applied to the video encoder 100 to perform its video encoding function as will be explained with reference to FIG. 3. The phase 25 is applied to sinusoidal signal generator 59, which is preferably a sine-table read only memory, in order to generate the constant amplitude sinusoidal signal 26.

Referring to FIG. 3, a video encoder 100 using the digital amplitude and phase detector 10 as an example of the invention is shown. The video encoder's primary purpose is to synthesize the chrominance and luminance signals from an input video signal containing RGB information for each pixel location on a television's CRT. The source of the input video signal may be a microprocessor (not shown) which can be programmed to output video signals containing, for example, in menu form user interface information such as clock time, close caption mode, sleep mode, v-chip mode and other functions and parameters. The displayed information is usually overlaid with the video image being displayed on the CRT; and therefore, combining both the synthesized video signal and the received video signal is necessary to generate such an overlay of video images on the CRT.

Because the color information contained in the chrominance signal depends on the relative amplitude and phase of the chrominance signal with respect to that of the color burst signal, in order to properly synthesize the chrominance signal, detection of the amplitude and phase of the color burst is required. Therefore, the video encoder 100 as shown in FIG. 3 implements the digital amplitude and phase detector 10 in order to detect the amplitude and phase of the color burst signal. The video encoder 100 uses the detected color burst signal amplitude and phase to synthesize the chrominance signal corresponding to the input video signal.

In more detail, the video encoder 100 comprises a look-up table 102, which preferably is a read only memory (ROM). A video signal 120 generated by a microprocessor (not shown) containing RGB information is applied to the address inputs of look-up table 102. As mentioned earlier, video signal 120 may be used to display in menu form user interface information such as clock time, close caption and sleep modes, v-chip information and other information and parameters so that the user can see this information. The look-up table 102 also receives by way of its address inputs either one of television standard designating signals 122 and 124 corresponding to the NTSC and PAL, respectively. These signals tell the look-up table what standard is being used with the video encoder in order for the look-up table to output the proper video information.

Depending on which standard the video encoder is using, i.e. the NTSC and PAL standards, the look-up table generates along its data outputs a particular luminance signal 126, uncompensated chrominance signal phase 128 and uncompensated chrominance signal amplitude 130 corresponding to video signal 120. The uncompensated chrominance phase 128 and angle 130 generated by the look-up table, however, are not referenced to the received color burst signal. Therefore, the rest of the video encoder components are implemented, among other purposes, to compensate the uncompensated chrominance phase 128 and amplitude 130 by the color burst signal phase and amplitude.

In order to compensate the uncompensated chrominance amplitude 130 by the amplitude of the color burst signal, the digital amplitude detector 10 is used to detect the amplitude of the received color burst signal 22. The detected color burst amplitude 32 is then multiplied with a saturated adjustment signal 138 by multiplier 108. The saturated adjustment signal 138 is used to allow the user control of the color saturation of the image produced on the CRT. The multiplication of these two signals results in an amplitude compensation signal 142. The uncompensated chrominance amplitude 130 is bandlimited by chroma low pass filter 104 to form a bandlimited chrominance amplitude signal 134. Preferably, chroma low pass filter 104 is a 14th order finite impulse response (FIR) digital low pass filter having a cutoff frequency of about 0.9 Mhz. This bandlimited chrominance amplitude 134 is amplitude compensated by multiplying it by the amplitude compensation signal 142 with multiplier 110; thereby, resulting in an amplitude-compensated, bandlimited chrominance amplitude 144.

The digital amplitude detector 10 can also be used to phase compensate the chrominance phase 128 since it detects the phase of the color burst signal 22 in performing the amplitude detection. The detected color burst phase 25 is added with a hue adjustment signal 140 by adder 114. The hue adjustment signal 140 is used for allowing the user to adjust the tint of the video image displayed on the CRT. The resulting addition of these two signals is a phase compensation signal 146. The uncompensated chrominance phase 128 is bandlimited by chroma low pass filter 106 to form a bandlimited chrominance phase 136. Preferably, chroma low pass filter 106 is a 14th order finite impulse response (FIR) digital low pass filter having a cutoff frequency of about 0.9 Mhz. The bandlimited chrominance phase 136 is phase compensated by adding it with the phase compensation signal 146 by adder 116; thereby, resulting in a phase-compensated, bandlimited chrominance phase 148.

The phase-compensated, bandlimited chrominance phase 148 is applied to sinewave signal generating ROM 118 by way of the ROM address lines which produces a phase-modulated subcarrier 150 at the ROM data lines. The sinewave generator 118 produces a digital sinewave signal having a phase modulated by the phase-compensated chrominance phase 148. Accordingly, the subcarrier 150 has been phase modulated by the uncompensated chrominance phase 128 corresponding to the input video signal 120, by the phase due to the hue adjustment signal 140 and by the color burst phase 26. Thus, phase-modulated subcarrier 150 has the phase information needed for the color burst compensated chrominance signal 152.

The phase-modulated subcarrier 150 is multiplied by the amplitude-compensated, bandlimited chrominance amplitude 144 with multiplier 112; thereby, amplitude modulating the phase-modulated subcarrier 150 to form the color burst compensated chrominance signal 152 having the color information of the input video signal 120. The color burst compensated chrominance signal 152 is then applied to the chrominance signal processing circuit of the television so that the image prescribed by the input video signal 120 is displayed and/or overlaid on the television's CRT display. All multipliers and adders used in the implementation of video encoder 100 are conventionally known digital multipliers and adders.

Although the various aspects of the invention have been described with respect to a preferred embodiment, it will be understood that the invention is entitled to full protection within the full scope of the appended claims.

It is claimed:

1. In a television system, a digital amplitude detector for detecting the amplitude of a color burst digital signal, comprising:

a phase lock loop circuit for generating a constant amplitude sinusoidal digital signal having a phase angle approximately 90 degrees out-of-phase with that of said color burst signal;

a delay circuit for delaying the color burst digital signal by a selected amount of clock cycles;

a multiplying circuit for generating a product signal by multiplying the delayed color burst signal by the constant amplitude sinusoidal signal, wherein said product signal has a high-frequency component and a low-frequency component having an amplitude response substantially proportional to that of the color burst signal; and a low pass filter circuit coupled to said multiplying circuit for filtering said product signal such that the intensity of the high-frequency component is substantially lower than that of the low-frequency component.

2. The digital amplitude detector as defined in claim 1, wherein the phase lock loop circuit is a digital phase lock loop.

3. The digital amplitude detector as defined in claim 2 wherein the digital phase lock loop comprises:

a sinusoidal digital signal generator for generating said constant amplitude sinusoidal signal;

a multiplier coupled to said sinusoidal signal generator for generating a phase error signal by multiplying the color burst signal by the constant amplitude sinusoidal signal;

a digital low pass filter coupled to the multiplier for filtering said phase error signal; and a modulo N phase counter coupled to said low pass filter for generating a control phase signal in response to said filtered phase error signal, such that the constant amplitude sinusoidal signal is substantially 90 degrees out-of-phase with said color burst signal.

4. The digital amplitude detector as defined in claim 2 wherein the digital phase lock loop further includes an adder interposed between said digital low pass filter and phase counter for adding a predetermined constant to said filtered phase error signal, wherein said pre-determined constant determines a center frequency of the frequency response of said digital phase lock loop.

5. The digital amplitude detector as defined in claim 1, wherein said delay circuit is a register.

6. The digital amplitude detector as defined in claim 1 wherein said low pass filter circuit is a second-order IIR digital low pass filter.

7. The digital amplitude detector as defined in claim 1, further having an analog-to-digital converter coupled to said phase lock loop and delay circuits, for generating the color burst digital signal from a color burst analog signal.

8. In a television system, a combination digital amplitude and phase detector for detecting the amplitude and phase of a color burst digital signal, comprising:

a phase lock loop circuit for detecting the phase of said color burst signal and for generating a constant amplitude sinusoidal digital signal having a frequency substantially the same as that of said color burst signal;

a multiplying circuit for generating a product signal by multiplying the color burst signal by the constant amplitude sinusoidal signal, wherein said product signal has a high-frequency component and a low-frequency component having an amplitude substantially proportional to that of the color burst;

a delay circuit for delaying either or both said color burst signal and constant amplitude sinusoidal signal by a selected amount of clock cycles, such that the phase difference between the signals when said signals are multiplied by the multiplying circuit is not 90 degrees; and a low pass filter circuit coupled to said multiplying circuit for filtering said product signal such that the intensity of the high-frequency component is substantially lower than that of the low-frequency component.

9. The combination digital amplitude and phase detector as defined in claim 8, wherein the phase lock loop circuit is a digital phase lock loop.

10. The combination digital amplitude and phase detector as defined in claim 9 wherein the digital phase lock loop comprises:

a sinusoidal digital signal generator for generating said constant amplitude sinusoidal signal;

a multiplier coupled to said sinusoidal signal generator for generating a phase error signal by multiplying the color burst signal by the constant amplitude sinusoidal signal;

a digital low pass filter coupled to the multiplier for filtering said phase error signal; and a modulo N phase counter coupled to said low pass filter for generating a control phase signal in response to said filtered phase error signal, wherein said phase control signal is for controlling the sinusoidal signal generator such that the frequency of the constant amplitude sinusoidal signal is substantially the same as that of said color burst signal.

11. The combination digital amplitude and phase detector as defined in claim 10 wherein the digital phase lock loop further includes an adder interposed between said digital low pass filter and phase counter for adding a pre-determined constant to said filtered phase error signal, wherein said predetermined constant determines a center frequency of the frequency response of said digital phase lock loop.

12. The combination digital amplitude and phase detector as defined in claim 8, wherein said delay circuit is a register.

13. The combination digital amplitude and phase detector as defined in claim 8 wherein said low pass filter circuit is a second-order IIR digital low pass filter.

14. The combination digital amplitude and phase detector as defined in claim 8, further having an analog-to-digital converter coupled to said phase lock loop and delay circuits, for generating the color burst digital signal from a color burst analog signal.

15. In a television system, a method for detecting a time-varying amplitude of a color burst digital signal, comprising:

removing the time-varying amplitude from said color burst signal thereby generating a constant amplitude signal, wherein the frequency of said constant amplitude signal is substantially the same as that of the color burst signal;

multiplying said color burst signal by said constant amplitude signal for generating a product signal having a high-frequency component and a low-frequency component having an amplitude response substantially proportional to the time-varying amplitude; and filtering the product signal such that the intensity of the high-frequency component is substantially lower than that of the low-frequency component.

16. The method of detecting the amplitude of the color burst digital signal as defined in claim 15 wherein the removing the time-varying amplitude from said color burst signal is accomplished by a phase lock loop circuit.

17. The method of detecting the amplitude of the color burst digital signal as defined in claim 15 further having the step of delaying the color burst signal by a selected amount of clock cycles.

18. The method of detecting the amplitude of the color burst digital signal as defined in claim 15 further having the step of delaying the constant amplitude signal by a selected amount of clock cycles.

19. The method of detecting the amplitude of the color burst digital signal as defined in claim 17 wherein the step of delaying the color burst signal is accomplished by a register.

20. The method of detecting the amplitude of the color burst digital signal as defined in claim 18, wherein the step of delaying the constant amplitude signal by a selected amount of clock cycles is accomplished by a register.

21. The method of detecting the amplitude of the color burst digital signal as defined in claim 15, wherein the step of filtering said product signal is accomplished by an IIR digital low pass filter.

22. In a television system, a video encoder for generating a color burst compensated chrominance signal from an input video signal comprising:

means for generating an uncompensated chrominance amplitude and phase corresponding to the input video signal;

means for detecting the amplitude and phase of a color burst signal;

a first adder circuit for adding the phase of the color burst signal to the uncompensated chrominance phase for producing a compensated chrominance phase;

a first multiplier circuit for multiplying the amplitude of the color burst signal by the chrominance amplitude for producing a compensated chrominance amplitude;

a sinewave digital signal generator for generating a sinusoidal digital signal being phase modulated by the compensated chrominance phase; and a second multiplier circuit for amplitude modulating the sinusoidal digital signal by the compensated chrominance amplitude, thereby generating the color burst compensated chrominance signal.

23. The video encoder as defined in claim 22 wherein the means for generating an uncompensated chrominance amplitude and phase is a read only memory having address inputs coupled to the input video signal and having data outputs for providing the uncompensated chrominance amplitude and phase.

24. The video encoder as defined in claim 23 further having the address inputs of the read only memory coupled to a video standard designating signal for generating the uncompensated chrominance amplitude and phase corresponding to said video standard.

25. The video encoder as defined in claim 24 wherein the video standard is either the NTSC or PAL standard.

26. The video encoder as defined in claim 22 further having a third multiplier circuit for multiplying the color burst amplitude by a saturated adjustment signal.

27. The video encoder as defined in claim 22 further having a second adder circuit for adding a hue adjustment signal to the color burst phase.

28. The video encoder as defined in claim 22 further having low pass filter circuits for filtering the chrominance phase and amplitude.

29. The video encoder as defined in claim 22 wherein sinewave digital signal generator is a sinewave generating read only memory having address inputs coupled to the compensated chrominance phase and data outputs for producing said sinusoidal digital signal.

30. The video encoder as defined in claim 22 wherein the means for detecting the amplitude and phase of the color burst signal is a digital amplitude and phase detector.

* * * * *